Figure 2:
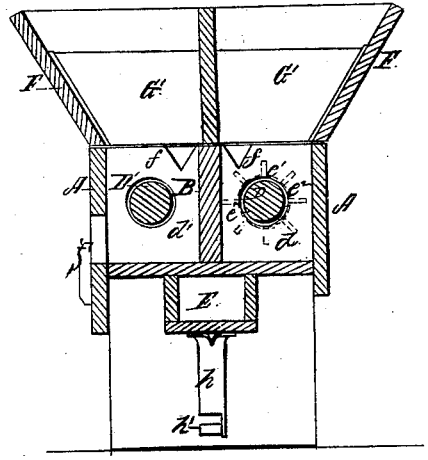

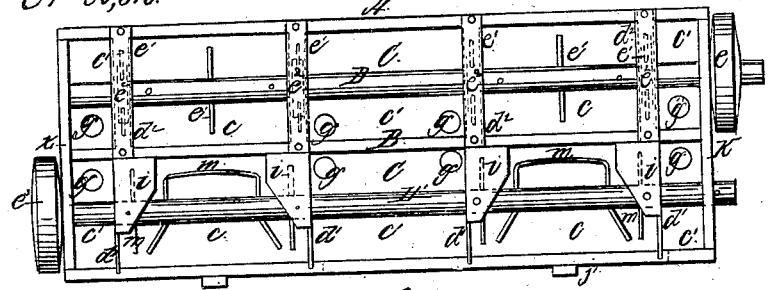
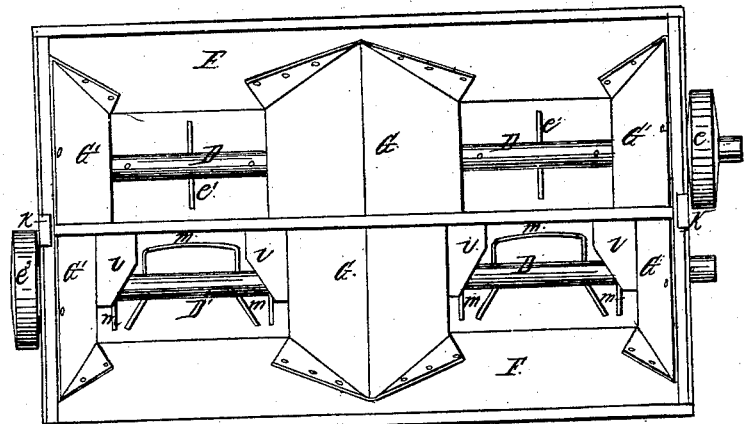
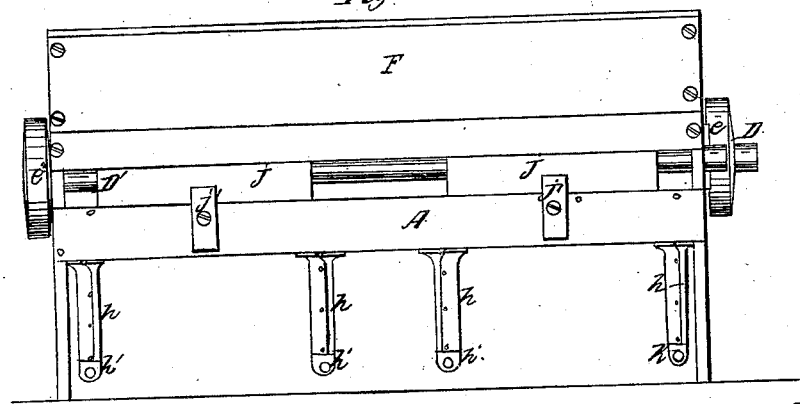

Sheet 2, 2 Sheets.

T. B. McConaughey.
Fertilizer and Seed Drill.

Nº 86,313.  Patented Jan. 26, 1869.

Witnesses
John A Ely
J. M. Rider

Inventor.
T. B. McConaughey
per
S. H. Alexander
Atty

United States Patent Office.

THOMAS B. McCONAUGHEY, OF NEWARK, DELAWARE, ASSIGNOR TO HIMSELF AND JAMES ADAMS, OF THE SAME PLACE.

Letters Patent No. 86,313, dated January 26, 1869.

IMPROVEMENT IN FERTILIZER AND SEED-DRILL.

The Schedule referred to in these Letters Patent and making part of the same.

*To all whom it may concern:*

Be it known that I, THOMAS B. MCCONAUGHEY, of Newark, in the county of New Castle, and State of Delaware, have invented certain new and useful Improvements in Seed-Drills and Fertilizing-Machines; and I do hereby declare that the following is a full, clear, and exact description thereof, reference being had to the accompanying drawings, and to the letters of reference marked thereon, which form a part of this specification, and in which—

Figure 1 represents a plan or top view of my invention, with the seed-trough removed;

Figure 2, a similar view, with the latter-named device attached;

Figure 3, a side view of the same, showing the seed-spouts and distributers; and Figure 4, an end view.

The nature of this invention consists in providing the seed-box with a fertilizer and seed-apartment, through which pass agitator-bars or shafts, supplied with peculiarly-constructed distributers or conductors; in the employment of perforated partitions in the seed-box, bent or formed, at their upper ends, with right-angular pieces or shields, placed in contact with the lower ends of cone-shaped partitions in the adjustable hopper or trough of the seed-box; and, lastly, in supplying the seed-spouts or tubes with distributing or scattering-pins.

To enable others to make and employ my invention, I will now describe its construction and operation.

In the accompanying drawings—

A represents the seed-box, to the lower side of which, at each end, is secured a support or pendant, which is designed to be attached or mounted on suitable running gear.

The seed-box A is provided with a partition, B, extending through its entire length, and forming a chamber, C, on each of its sides and the inner sides of the seed-box, one being designed for seed and the other for fertilizers.

The chambers or apartments C C are divided into smaller apartments or cells $c'$ $c'$, by means of cross-pieces or partitions $d$ $d^1$, which are provided, at their upper ends, with inverted cone-shaped openings $f$, through which the seed are transferred from one cell to the other.

The upper ends of the partitions $d$, of the seed-apartment, are provided or formed with metal strips or plates, $d^2$, placed at right angles therewith, and acting as shields or protectors to conveyers or distributers on the agitator-bar, near the openings $ff$, for the purpose of preventing dirt, or any other obstacle, from interfering with the conveyers or conductors while transferring the seed through the above-named openings.

D is the agitator-bar, which is supplied at its outer end with a pulley, $e$, over which a belt is designed to pass, communicating with one of the driving-wheels, and supplied, on the inside of the seed-apartment, with conveyers or conductors, $e^1$ $e^1$, the set of conveyers, situated beneath the shields $d^2$ $d^2$, being inserted in the circumference of wheels $e^2$ $e^2$, as seen in dotted lines in figs. 1 and 4, in order to facilitate the transferring of the seed through the openings $ff$, from the seed-cells $c$ $c$ to the cells $c'$ $c'$, which are provided, in their bottoms, with exit-openings $g$ $g$, communicating or provided with seed or fertilizer-spouts or tubes $h$ $h$.

These spouts are provided, on an extended portion of their surface, with pins or cylindrical bars, $h'$ $h'$, against which, when the machine is in motion, the seed, descending the spouts $h$ $h$, are made to come in contact, scattering them evenly and perfectly over the ground.

E is a box or receiver, secured to the under side of the seed-box A, extending its entire length, and through which the seed and fertilizers pass from the openings in the bottom of the seed-box to the spouts $h$ $h$, attached to its lower side.

D′ is another agitator-bar, also provided with a pinion or pulley, $e^3$, operated similarly to agitator-bar D, and passing through the fertilizer-apartment C, and partitions $d^1$ $d^1$.

This bar D′ is also supplied with conveyers or conductors, $m$, made as seen in figs. 1 and 2, and which operate in a similar manner to the conductors $e^1$ $e^1$ of the seed-apartment, carrying the fertilizers through openings $ff$ of partitions $d^1$ $d^1$, and precipitating the same into cells $c'$ $c'$, supplied with openings $g$ $g$, connecting with the receiver or box E and seed or fertilizer-spouts $h$ $h$ with scattering-pins $h'$ $h'$.

The partitions $d^1$ $d^1$ are formed or provided, at their upper ends, with shields, $i$ $i$, constructed as shown in figs. 1 and 2, and for the purpose already set forth in connection with the shields $d^2$ of the seed-apartment.

$j$ $j$ are doors, supplied to the fertilizer-cells $c$ $c$, and held in place by means of buttons $j'$ $j'$.

F is the seed-hopper or trough, provided at each end with grooves, into which fit and secure it on the seed-box, standards, $k$ $k$, fastened to the ends of the seed-box.

The inside of the hopper F is provided with cone-shaped covers or partitions, G, which are designed to cover the cells, provided with the openings $g$ $g$, for the escape of the seed and fertilizers.

The ends of this hopper, on the inside, are also supplied with covers G′, which are made to extend outward at their lower ends, so as to cover openings of a similar character, as openings $g$ $g$, in the seed and fertilizer-cells.

These covers do not extend across the entire width of the seed-hopper, but are separated by a partition, placed in a line with the partition B of seed-box A, and secured to the inner sides of the ends of the hopper F.

What I claim, and desire to secure by Letters Patent, is—

1. The employment of the partitions $d^1 d^1$, provided with the openings $f f$, and shields or protectors $d^2 d^2$ and $i i$, constructed, arranged, and operating substantially as and for the purpose described.

2. The partitions $d^1 d^1$, and shields $i d^2$, in combination with the cone-shaped covers $G G'$, pulley $e$, and conductors $e^1 e^1$, all constructed and arranged as set forth.

In testimony that I claim the foregoing as my own, I affix my signature, in presence of two witnesses.

THOS. B. McCONAUGHEY.

Witnesses:
ALEXANDER WILSON,
JOHN J. HERDMAN.